United States Patent
Nakajima (10) Patent No.: US 11,817,694 B2
(45) Date of Patent: Nov. 14, 2023

(54) PROTECTION ELEMENT AND PROTECTION CIRCUIT FOR A BATTERY

(71) Applicant: Schott Japan Corporation, Koka (JP)

(72) Inventor: Shintaro Nakajima, Koka (JP)

(73) Assignee: Schott Japan Corporation, Koka (JP)

(*) Notice: Subject to any disclaimer, the term of this patent is extended or adjusted under 35 U.S.C. 154(b) by 374 days.

(21) Appl. No.: 17/281,968

(22) PCT Filed: Sep. 25, 2019

(86) PCT No.: PCT/JP2019/037560
§ 371 (c)(1),
(2) Date: Mar. 31, 2021

(87) PCT Pub. No.: WO2020/071203
PCT Pub. Date: Apr. 9, 2020

(65) Prior Publication Data
US 2021/0376592 A1    Dec. 2, 2021

(30) Foreign Application Priority Data

Oct. 1, 2018  (JP) ................. 2018-186425

(51) Int. Cl.
*H02H 3/10* (2006.01)
*H01H 85/143* (2006.01)
(Continued)

(52) U.S. Cl.
CPC ............ *H02H 3/10* (2013.01); *H01H 85/143* (2013.01); *H02H 1/0007* (2013.01); *H01H 2085/0275* (2013.01)

(58) Field of Classification Search
CPC ..... H01H 2037/046; H01H 2085/0275; H01H 37/32; H01H 37/64; H01H 37/76;
(Continued)

(56) References Cited

U.S. PATENT DOCUMENTS 6,351,361 B1 * 2/2002 Kawazu ............... H01H 85/463
361/103
2001/0044168 A1  11/2001 Furuuchi et al.
(Continued)

FOREIGN PATENT DOCUMENTS

JP    2001325868 A    11/2001
JP    4095426 B2    3/2008
(Continued)

OTHER PUBLICATIONS

(English Translation) Office Action dated Dec. 21, 2022 in KR application No. 10-2021-7007942; pp. all.
(Continued)

*Primary Examiner* — Jared Fureman
*Assistant Examiner* — Nicolas Bellido
(74) *Attorney, Agent, or Firm* — Dorsey & Whitney LLP (57) ABSTRACT

To provide a protection element and a protection circuit that can protect from an overcurrent without using rectifying means such as a diode or a switching element, and can more reliably interrupt passage of an electric current during operation with a simpler circuit configuration. A protection element including: an insulating substrate; at least a pair of fuse electrodes provided on the insulating substrate; an intermediate electrode provided on the insulating substrate between the fuse electrodes; a fuse element joined to the fuse electrodes and the intermediate electrode, and electrically connected to the fuse electrodes and the intermediate electrode; and a heating element provided on the insulating substrate to be electrically connected to the intermediate electrode and a heating electrode, wherein conduction means between at least a pair of electrodes of the fuse electrodes including the intermediate electrode is provided differently from conduction means between the other electrodes.

16 Claims, 4 Drawing Sheets

(51) Int. Cl.
*H02H 1/00* (2006.01)
*H01H 85/02* (2006.01)

(58) Field of Classification Search
CPC .... H01H 37/761; H01H 69/02; H01H 69/022; H01H 85/02; H01H 85/0241; H01H 85/12; H01H 85/143; H01H 85/46; H01H 85/463; H01H 85/48; H01L 23/5256; H01M 10/42; H01M 10/425; H01M 10/44; H01M 10/46; H01M 10/482; H01M 2200/101; H01M 2200/103; H01M 50/583; H02H 1/0007; H02H 3/10; H02H 7/18; H02H 9/00; H02J 7/00; H02J 7/0024; H02J 7/00304; H02J 7/00308; H02J 7/0031; H02J 7/18; Y02E 60/10; Y10T 29/49107
See application file for complete search history.

(56) References Cited

U.S. PATENT DOCUMENTS

| | | | | |
|---|---|---|---|---|
| 2002/0014945 | A1* | 2/2002 | Furuuchi | H01L 23/5256 |
| | | | | 257/E23.149 |
| 2005/0221164 | A1* | 10/2005 | Kawazu | H01M 10/42 |
| | | | | 429/61 |
| 2010/0245024 | A1* | 9/2010 | Furuuchi | H01H 85/463 |
| | | | | 361/104 |
| 2014/0133059 | A1* | 5/2014 | Wang | H01H 85/0047 |
| | | | | 361/103 |
| 2015/0130585 | A1* | 5/2015 | Nakajima | H01H 69/022 |
| | | | | 337/413 |
| 2021/0343494 | A1* | 11/2021 | Nakajima | B23K 35/0238 |
| 2022/0293371 | A1* | 9/2022 | Nakajima | H01H 37/761 |

FOREIGN PATENT DOCUMENTS

| | | | |
|---|---|---|---|
| JP | 2008311106 A | 12/2008 | |
| JP | 2008311161 A | 12/2008 | |
| JP | 2009070805 A | 4/2009 | |
| JP | 2015201313 A | * 11/2015 | ............ H01H 37/76 |
| JP | 2015201313 A | 11/2015 | |
| KR | 101167543 B1 | 7/2012 | |
| WO | 2008156013 A1 | 12/2008 | |
| WO | 2013172160 A1 | 11/2013 | |

OTHER PUBLICATIONS

English Translation of International Search Report and Written Opinion received in PCT Application No. PCT/JP2019/037560 dated Dec. 3, 2019.
English Translation of Notice of Reasons for Refusal, dated Jun. 11, 2021, for JP Application No. 2018-186425.
English Translation of Office Action received in TW Application No. 108135511 dated Jun. 23, 2021.
English Translation of the International Preliminary Report on Patentability received in PCT/JP2019/037560 dated Mar. 23, 2021.
[English Translation] Notice of Reasons for Refusal dated Dec. 17, 2021 for Japanese Patent Application No. 2018-186425; pp. all.
[English Translation] Submission of Information submitted on Nov. 24, 2020 for Japanese Patent Application No. 2018-186425; pp. all.

* cited by examiner

PROTECTION ELEMENT AND PROTECTION CIRCUIT FOR A BATTERY

RELATED APPLICATIONS

This application is a U.S. National Stage filing under 35 U.S.C. § 371 of PCT Application No. PCT/JP2019/037560, filed Sep. 25, 2019, which claims priority to Japanese Application No. 2018-186425 filed Oct. 1, 2018, which applications are incorporated herein by reference in their entirety, for any purpose.

TECHNICAL FIELD

The present disclosure relates to a protection element and a protection circuit for an electric/electronic device.

BACKGROUND ART

In recent years, with the rapid spread of downsized electronic devices such as mobile devices, a downsized thin protection element is used to be mounted on a protection circuit of a power supply installed in the electronic device. In a protection circuit of a secondary battery pack, a protection element that is a surface mount device (SMD) is preferably used as disclosed in, for example, Patent Literature 1. These protection elements include a non-resettable protection element. When the non-resettable protection element detects an abnormal state such as an overcurrent or overvoltage caused by an overcurrent flowing through a protected device, or senses an abnormally overheated ambient temperature, this non-resettable protection element activates a fuse on a predetermined condition to interrupt an electric circuit. To ensure the safety of a device, the protection element causes a resistance element to generate heat using a signal current when a protection circuit detects an abnormality occurring in the device. The protection element uses the generated heat to melt a fuse element of fusible alloy material to interrupt the circuit, or applies an overcurrent to melt the fuse element to interrupt the circuit.

Figure 3A:
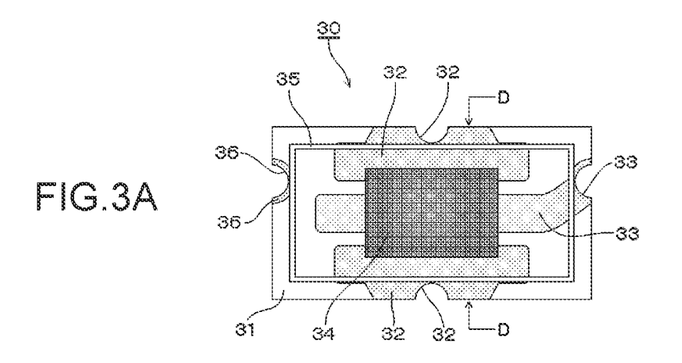
FIG. 3A is a plan view taken along the d-d line in FIG. 3B passing through a lid body.
Figure 3B:
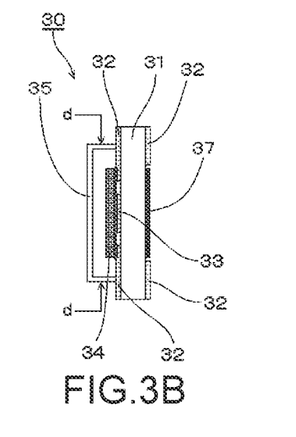
FIG. 3B is a cross-sectional view taken along the line D-D in FIG. 3A.
Figure 3C:
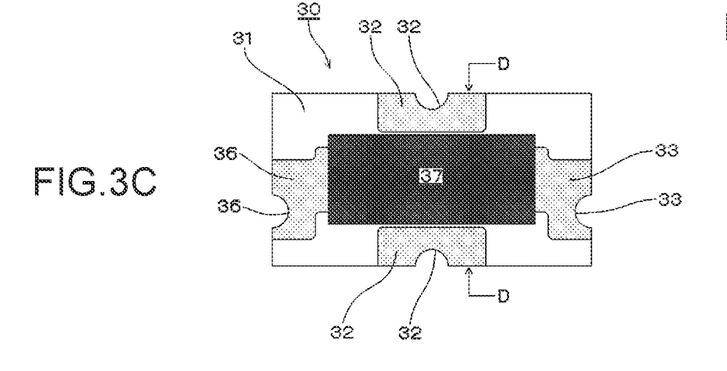
FIG. 3C is a bottom view of the protection element 30.

FIGS. 3A-C illustrates a protection element 30 as the related technique of the present disclosure. The protection element 30 includes an insulating substrate 31, a pair of fuse electrodes 32 provided on the insulating substrate 31, an intermediate electrode 33 provided between the fuse electrodes 32, a fuse element 34 joined to the fuse electrodes 32 and the intermediate electrode 33, and electrically connected to the fuse electrodes 32 and the intermediate electrode 33, and a cap-like lid body 35 covering the fuse element 34. On the insulating substrate 31, a heating element 37 is provided to be electrically connected to the intermediate electrode 33 and a heating electrode 36.

Figure 4A:
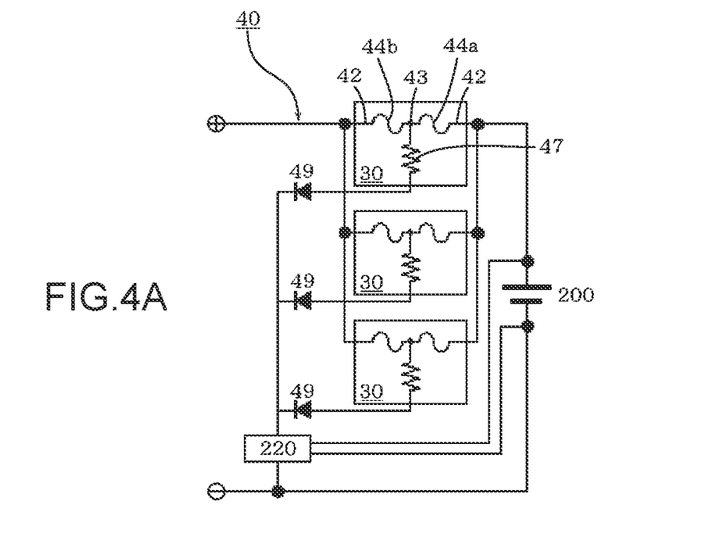
FIG. 4A is a circuit diagram before operation of fuses.
Figure 4B:
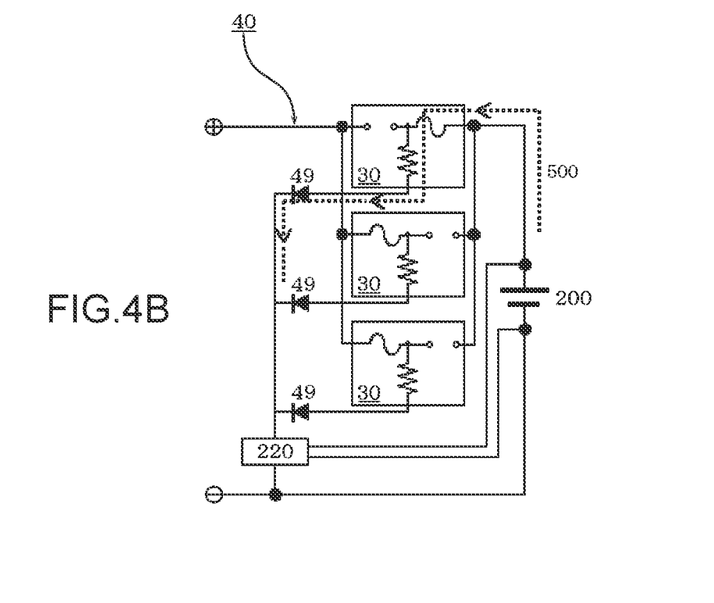
FIG. 4B is a circuit diagram after operation of the fuses due to an overcurrent.

As disclosed in, for example, Patent Literature 2, the protection element 30 described above is connected to a protection circuit 40 for a secondary battery pack illustrated in FIG. 4A, so that fuse elements 44a and 44b, which are electrically connected to fuse electrodes 42, form a part of the charging-discharging current circuit of the protection circuit 40. A heating element 47 of the protection element 30 is connected to a rectifying element 49 such as a diode or a switching element. As illustrated in FIG. 4B, to protect the battery pack from an overcurrent, the rectifying element 49 prevents a leak current 500 from flowing when the fuse element 44a or 44b remains on only one side between the fuse electrode 42 and the intermediate electrode 43. When an overvoltage is detected, detecting means 220 constituted by a voltage-detection IC, an FET, and other components, and electrically connected to the heating element 47 applies a voltage to the heating element, and consequently the heating element generates heat, which melts all the fuse elements and stops application of the voltage to the heating element. It is therefore unnecessary to compensate for the one-side operation as described above.

DOCUMENT LIST

Patent Literatures

Patent Literature 1: International Publication No. WO 2013172160
Patent Literature 2: Japanese Patent Publication No. 4095426

SUMMARY OF INVENTION

Technical Problem

The protection element 30 and the protection circuit 40 according to the conventional technique as described above need to include rectifying means such as a diode or a switching element in preparation for a case where either the fuse element 44a or 44b may remain on one side when an overcurrent flows.

It is an object of the present disclosure to provide a protection element and a protection circuit for an electric/electronic device, which can protect the device from an overcurrent without using rectifying means such as a diode or a switching element, and can more reliably interrupt passage of an electric current during operation with a simpler circuit configuration.

Solution to Problem

A protection element of the present disclosure includes: an insulating substrate; at least a pair of fuse electrodes provided on the insulating substrate; an intermediate electrode provided on the insulating substrate between the fuse electrodes; a fuse element electrically connected to the fuse electrodes and the intermediate electrode; and a heating element provided on the insulating substrate to be electrically connected to the intermediate electrode and a heating electrode, wherein conduction means between at least a pair of electrodes of the fuse electrodes including the intermediate electrode is provided differently from conduction means between the other electrodes. Due to this configuration, in protection from an overcurrent, it is possible to control the fusing order between electrodes connected by the fuse element. The conduction means described herein refers to an electrical conductivity, a heat conductivity, or a combination of the electrical conductivity and the heat conductivity. For example, an electrical resistance, heat dissipation, or a combination of the electrical resistance and the heat dissipation is used to make a difference in heat-generation and heat-dissipation properties when an electric current passes through a predetermined point. Thus, a fuse element between predetermined electrodes can be controlled such that this fuse element is melted earlier than another fuse element between the other electrodes.

A protection circuit of the present disclosure is a protection circuit using the protection element in a protection device, the protection circuit being an electric circuit to protect a secondary battery from an overcurrent and an overvoltage, the protection circuit including: a protection device including a fuse element and a heating element; and detecting means electrically connected to the heating element of the protection device, the detecting means detecting an overvoltage of the secondary battery and controlling a current that flows through the heating element, wherein the protection device is constituted by a protection element including an insulating substrate, at least a pair of fuse electrodes provided on the insulating substrate, an intermediate electrode provided on the insulating substrate between the fuse electrodes, a fuse element electrically connected to the fuse electrodes and the intermediate electrode, and a heating element provided on the insulating substrate to be electrically connected to the intermediate electrode and a heating electrode, the protection element being provided with conduction means between at least a pair of electrodes of the fuse electrodes including the intermediate electrode differently from conduction means between the other electrodes, and when an overcurrent is detected, the fuse element having been predetermined is melted due to the conduction means, and when an overvoltage is detected, a voltage of the secondary battery is applied to the heating element by the detecting means, and consequently the heating element generates heat, so that all fuse elements are melted and application of the voltage to the heating element can be interrupted. Further, the protection circuit described above can form an electrode of an electric circuit, to which the protection device is electrically connected and attached, as the conduction means of the protection device. The area or thickness of an electrode and a wire, to be mounted on a wiring substrate to which the protection device (protection element) is attached, may be changed. For example, an electrode or a wire in an electric circuit, to which a predetermined electrode of the protection device is attached, has a smaller area to make it more difficult to dissipate heat, while an electrode or a wire in the electric circuit, to which electrodes other than the predetermined electrode are attached, has a larger area to make it easier to dissipate heat. This allows the predetermined electrode of the protection device to be melted earlier than the other electrodes.

The protection element and the protection circuit of the present disclosure control the fusing order when an overcurrent is detected by adjusting a conductivity (an electrical conductivity, a heat conductivity, or a combination of the electrical conductivity and the heat conductivity) between predetermined electrodes of the fuse electrodes including the intermediate electrode.

Effects of Invention

The effect obtained by the representative one of the inventions of the present disclosure will be briefly described as follows. According to one embodiment of the present disclosure, passage of an electric current can be more reliably interrupted during operation of fuses.

BRIEF DESCRIPTION OF DRAWINGS

FIG. 1A illustrates a protection element 10 according to one embodiment.

FIG. 1B illustrates a protection element 10 according to one embodiment.

FIG. 1C illustrates a protection element 10 according to one embodiment.

FIG. 2A illustrates a circuit diagram of a protection circuit 20 according to one embodiment.

FIG. 2B illustrates a circuit diagram of a protection circuit 20 according to one embodiment.

FIG. 3A illustrates a protection element 30 according to the conventional technique.

FIG. 3B illustrates a protection element 30 according to the conventional technique.

FIG. 3C illustrates a protection element 30 according to the conventional technique.

FIG. 4A illustrates a circuit diagram of a protection circuit 40 according to the conventional technique.

FIG. 4B illustrates a circuit diagrams of a protection circuit 40 according to the conventional technique.

DESCRIPTION OF EMBODIMENTS

A protection element according to the present embodiment includes an insulating substrate, at least a pair of fuse electrodes provided on the insulating substrate, an intermediate electrode provided on the insulating substrate between the fuse electrodes, a fuse element joined to the fuse electrodes and the intermediate electrode, and electrically connected to the fuse electrodes and the intermediate electrode, and a heating element provided on the insulating substrate to be electrically connected to the intermediate electrode and a heating electrode, wherein conduction means between at least a pair of electrodes of the fuse electrodes including the intermediate electrode is provided differently from conduction means between the other electrodes. The insulating substrate may be made of any insulating material of any composition, which is preferably, for example, plastic, glass, glass ceramics, or ceramics. The fuse electrodes, the intermediate electrode, and the heating electrode provided on the insulating substrate may be made of any electrically-conducting material of any composition, which is preferably, for example, copper, silver, copper alloy, or silver alloy. The fuse element may be made of any easily-fusible metal material of any composition. For example, tin-based alloy, alloy of tin and lead, alloy of tin and copper, alloy of tin and silver, or alloy of tin, silver, and copper may be preferably used. The fuse element may use metal material of single composition, or composite material combining plural types of metal materials of different compositions.

As the conduction means in which a conductivity between at least a pair of electrodes of the fuse electrodes including the intermediate electrode is provided differently from a conductivity between the other electrodes, any method or any means may be used as long as the method or means can adjust an electrical conductivity or a heat conductivity between electrodes across which the fuse element extends. The conduction means is not limited to a particular method or means. However, for example, the conductivity between electrodes may be adjusted by changing the cross-sectional area or length of the fuse element extending across the electrodes for each pair of electrodes, or by changing the material type of the fuse element itself for each pair of electrodes, or by changing the area or material of the electrode. The same effects are also obtained by setting a relatively greater electrode-to-electrode distance between predetermined electrodes of the fuse electrodes including the intermediate electrode, instead of changing the dimensions or material type of the fuse element. For example, an electrical resistance between predetermined electrodes of the fuse electrodes including the intermediate electrode is set higher than an electrical resistance between the other electrodes, so that when an overcurrent is detected, the fusing order between a plurality of electrodes connected by the fuse element can be controlled. A fuse element of a fuse electrode whose electrical resistance is set higher can be melted earlier than a fuse element of a fuse electrode whose electrical resistance is set lower. In addition, a heat conductivity between predetermined electrodes of the fuse electrodes including the intermediate electrode is set lower than a heat conductivity between the other electrodes, so that when an overcurrent is detected, the fusing order between a plurality of electrodes connected by the fuse element can be controlled. For example, a fuse element of a fuse electrode whose heat dissipation area (electrode area) is set smaller for a predetermined electrode can be melted earlier than a fuse element of a fuse electrode whose heat dissipation area (electrode area) is set larger.

A protection circuit according to the present embodiment is an electric circuit to protect a secondary battery from an overcurrent and an overvoltage, the protection circuit including a protection device including a fuse element and a heating element, and detecting means electrically connected to the heating element of the protection device, the detecting means detecting an overvoltage of the secondary battery and controlling a current that flows through the heating element, wherein the protection device is constituted by a protection element including an insulating substrate, at least a pair of fuse electrodes provided on the insulating substrate, an intermediate electrode provided on the insulating substrate between the fuse electrodes, a fuse element joined to the fuse electrodes and the intermediate electrode, and electrically connected to the fuse electrodes and the intermediate electrode, and a heating element provided on the insulating substrate to be electrically connected to the intermediate electrode and a heating electrode, the protection element being provided with conduction means between at least a pair of electrodes of the fuse electrodes including the intermediate electrode differently from conduction means between the other electrodes, and when an overcurrent is detected, a predetermined fuse element is melted due to the conduction means, and when an overvoltage is detected, a voltage of the secondary battery is applied to the heating element by the detecting means, and consequently the heating element generates heat, so that all fuse elements are melted and application of the voltage to the heating element is interrupted.

Figure 1A:
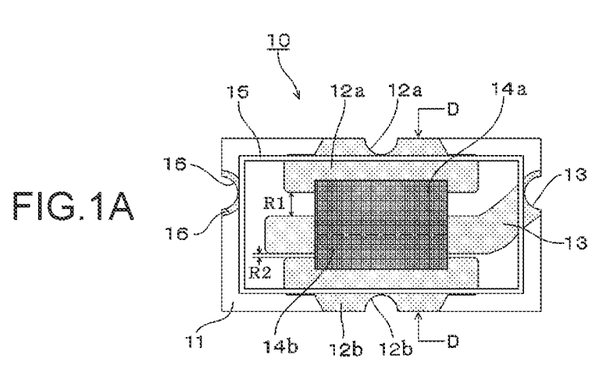
FIG. 1A is a plan view taken along the d-d line in FIG. 1B passing through a lid body.
Figure 1B:
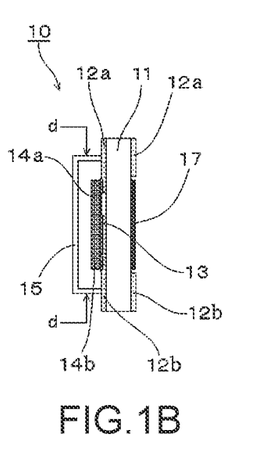
FIG. 1B is a cross-sectional view taken along the line D-D in FIG. 1A.
Figure 1C:
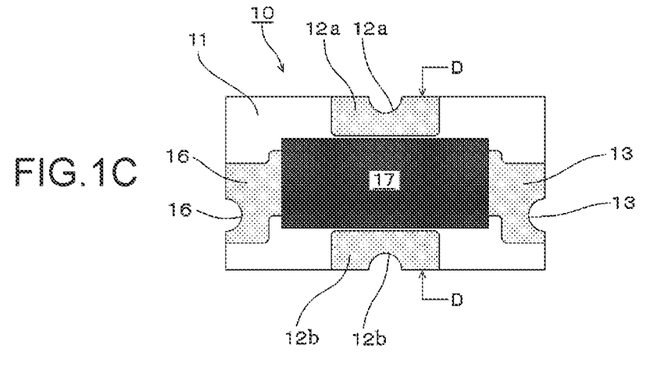
FIG. 1C is a bottom view of the protection element 10.

As illustrated in FIGS. 1A to 1C, a protection element 10 according to a first embodiment includes an insulating substrate 11, a pair of fuse electrodes 12 $a$ and 12 $b$ provided on the insulating substrate 11, an intermediate electrode 13 provided on the insulating substrate 11 between the fuse electrodes 12 $a$ and 12 $b$, a fuse element having a first portion 14 $a$ and a second portion 14 $b$ respectively joined to the fuse electrodes 12 $a$ and 12 $b$ and the intermediate electrode 13, and electrically connected to the fuse electrodes 12 $a$ and 12 $b$ and the intermediate electrode 13, an operating flux (not illustrated) applied on the surface of the fuse element 14 $a$ and 14 $b$, a lid body 15 covering the top of the fuse element portions 14 $a$ and 14 $b$ including this operating flux, and a heating element 17 provided on the insulating substrate 11, and constituted by a resistance element provided to be electrically connected to the intermediate electrode 13 and a heating electrode 16, wherein the protection element 10 includes conduction means in which an electrode-to-electrode distance R1 between electrodes of the fuse electrodes 12 $a$ and 12 $b$ including the intermediate electrode 13 is set greater, while an electrode-to-electrode distance R2 between the other electrodes is set less than R1, so that an electric resistance between the electrodes with the electrode-to-electrode distance R1 is set higher than that between the electrodes with the electrode-to-electrode distance R2. Due to this configuration, when an overcurrent is detected, the fuse element that electrically connects between the electrodes associated with the electrode-to-electrode distance R1 is melted earlier than the fuse element that electrically connects between the electrodes associated with the electrode-to-electrode distance R2. The shape or material type of the lid body 15 according to the present embodiment is not particularly limited as long as the lid body 15 can cover the top of the insulating substrate 11 and the fuse element portions 14 $a$ and 14 $b$ and ensure a desired cavity space. For example, as the lid body, a dome-shaped resin film cover, a plastic lid, or a ceramic lid is preferably used.

Figure 2A:
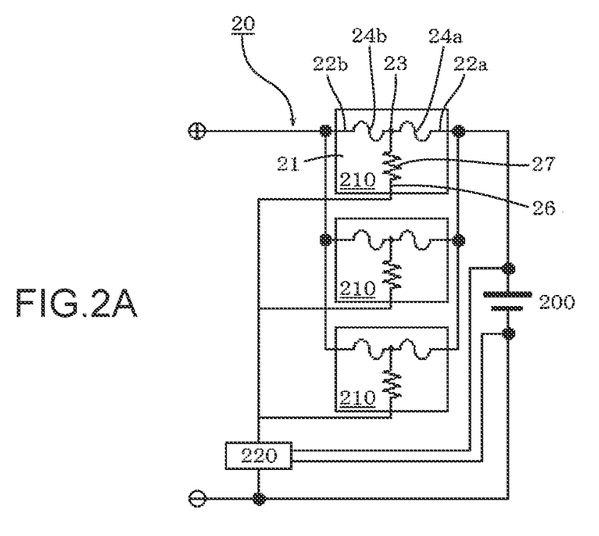
FIG. 2A is a circuit diagram before operation of fuses.
Figure 2B:
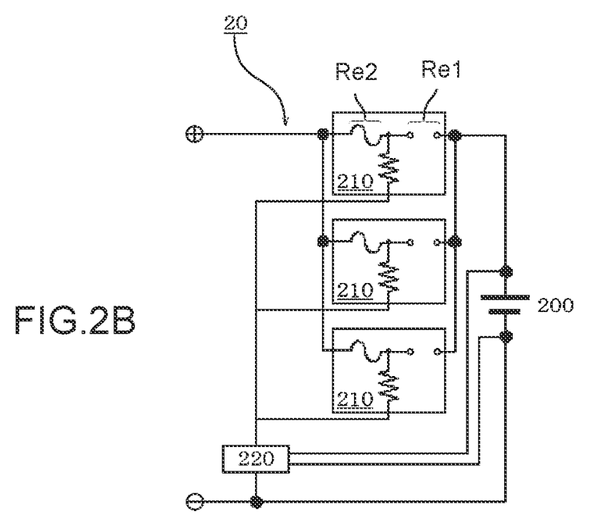
FIG. 2B is a circuit diagram after operation of the fuses due to an overcurrent.

As illustrated in FIGS. 2A and 2B, a protection circuit 20 according to a second embodiment is a protection circuit to protect a battery pack 200, in which secondary batteries are connected in series, from an overcurrent and an overvoltage, the protection circuit 20 including a protection device 210 including a first fuse element 24$a$, a second fuse element 24$b$, and a heating element 27, and detecting means 220 electrically connected to the heating element 27 of the protection device 210, and constituted by a voltage-detection IC and an FET to detect an overvoltage of the battery pack 200 and switch a current that flows through the heating element 27. The protection device 210 is constituted by a protection element including a first fuse electrode 22$a$ and a second fuse electrode 22$b$ provided on an insulating substrate 21, an intermediate electrode 23 provided on the insulating substrate 21 between the fuse electrodes 22$a$ and 22$b$, the first fuse element 24$a$ electrically connected to the first fuse electrode 22$a$ and the intermediate electrode 23, the second fuse element 24$b$ electrically connected to the second fuse electrode 22$b$ and the intermediate electrode 23, and the heating element 27 provided on the insulating substrate 21 to be electrically connected to the intermediate electrode 23 and a heating electrode 26, the protection element including conduction means in which an electrode-to-electrode distance R1 between the fuse electrode 22$a$ and the intermediate electrode 23 is set greater, while an electrode-to-electrode distance R2 between the fuse electrode 22$b$ and the intermediate electrode 23 is set less than R1. When an overcurrent is detected, the first fuse element 24$a$ is controlled such that the first fuse element 24$a$ is melted earlier due to the conduction means, and when an overvoltage is detected, the detecting means 220 switches on a current that flows through the heating element 27, so that a voltage of the secondary battery is applied to the heating element 27, and consequently the heating element 27 generates heat, so that the first fuse element 24$a$ and the second fuse element 24$b$ are melted and application of the voltage to the heating element 27 is interrupted. In the protection circuit 20 described above, where the internal resistance value of the first fuse element is represented as r1, while the internal resistance value of the second fuse element is represented as r2, then the electric resistance values are defined as $r1 > r2$. Thus, the protection circuit 20 allows the first fuse element 24$a$ with the internal resistance value r1 to be always melted when an overcurrent is applied. Due to this configuration, rectifying means such as a diode or a switching element can be omitted, which is conventionally considered to be necessary to protect from an overcurrent.

The embodiments disclosed in the present application should be considered as illustrative in all respects and not restrictive. The scope of the present invention is indicated not by the above descriptions, but by the claims, and is intended to include meanings equivalent to the claims and all modifications within the scope of the claims.

INDUSTRIAL APPLICABILITY

The present disclosure can be used in a protection device for a secondary battery such as a battery pack.

LIST OF REFERENCE SIGNS 10 protection element,
11, 21 insulating substrate,
12a, 12b fuse electrodes,
13, 23 intermediate electrode,
14a, 14b, fuse element portions,
15, lid body,
16, 26 heating electrode,
17, 27 heating element,
20 protection circuit,
22a first fuse electrode,
22b second fuse electrode,
24a first fuse element,
24b second fuse element,
200 battery pack,
210 protection device,
220 voltage detecting means,
R1 between predetermined electrodes,
R2 between other electrodes

The invention claimed is:

1. A protection element comprising:
an insulating substrate;
at least a pair of fuse electrodes comprising a first fuse electrode and a second fuse electrode provided on the insulating substrate;
an intermediate electrode provided on the insulating substrate between the first fuse electrode and the second fuse electrode;
a fuse element joined to the at least the pair of fuse electrodes and the intermediate electrode, and electrically connected to the at least the pair of fuse electrodes and the intermediate electrode, wherein a first portion of the fuse element joins the first fuse electrode and the intermediate electrode, and wherein a second portion of the fuse element joins the second fuse electrode and the intermediate electrode; and
a heating element provided on the insulating substrate to be electrically connected to the intermediate electrode and a heating electrode,
wherein a first conductivity between a pair of electrodes comprising the first fuse electrode and the intermediate electrode is different from a second conductivity between another pair of electrodes comprising the second fuse electrode and the intermediate electrode.

2. The protection element according to claim 1, wherein the first conductivity is based on a first cross-sectional area or a first length of the first portion of the fuse element extending across the pair of electrodes comprising the first fuse electrode and the intermediate electrode, and wherein the second conductivity is based on a second cross-sectional area or a second length of the second portion of the fuse element extending across the other pair of electrodes comprising the second fuse electrode and the intermediate electrode.

3. The protection element according to claim 1, wherein the first conductivity and the second conductivity are adjusted by changing a material type of the fuse element for the pair of electrodes and the other pair of electrodes.

4. The protection element according to claim 1, wherein the first conductivity is based on a first electrode-to-electrode distance between the first fuse electrode and the intermediate electrodes of the pair of electrodes, wherein the second conductivity is based on a second electrode-to-electrode distance between the second fuse electrode and the intermediate electrode of the other pair of electrodes, and wherein the first electrode-to-electrode distance is set to be greater than the second electrode-to-electrode distance.

5. The protection element according to claim 1, wherein the first conductivity is based on a first electric resistance between the first fuse electrode and the intermediate electrode of the pair of electrodes and the second conductivity is based on a second electric resistance between the second fuse electrode and the intermediate electrode of the other pair of electrodes, and wherein the first electric resistance is set to be greater than the second electric resistance.

6. The protection element according to claim 1, wherein the first conductivity is based on a first heat conductivity between the first fuse electrode and the intermediate electrode of the pair of electrodes, wherein the second conductivity is based on a second heat conductivity between the second fuse electrode and the intermediate electrode of the other pair of electrodes, and wherein the first heat conductivity is set to be lower than the second heat conductivity.

7. The protection element according to claim 1, wherein the first conductivity is based on a first heat dissipation area of one of the electrodes of the pair of electrodes, wherein the second conductivity is based on a second heat dissipation area of another one of the electrodes of the other pair of electrodes, and wherein the first heat dissipation area is set smaller than the second heat dissipation area.

8. A protection circuit for protecting a secondary battery from an overcurrent and an overvoltage, the protection circuit comprising:
a protection device including a fuse element and a heating element; and
a detector electrically connected to the heating element of the protection device, the detector detecting an overvoltage of the secondary battery and controlling a current that flows through the heating element,
wherein the protection device is constituted by a protection element including:
an insulating substrate,
at least a pair of fuse electrodes provided on the insulating substrate, the at least the pair of fuse electrode comprises a first fuse electrode and a second fuse electrode,
an intermediate electrode provided on the insulating substrate between the first fuse electrode and the second fuse electrode,
a fuse element electrically connected to the at least the pair of fuse electrodes and the intermediate electrode, wherein a first portion of the fuse element joins the first fuse electrode and the intermediate electrode, and wherein a second portion of the fuse element joins the second fuse electrode and the intermediate electrode and a heating element provided on the insulating substrate to be electrically connected to the intermediate electrode and a heating electrode, wherein in the protection element, a first conductivity between a pair of electrodes comprising the first fuse electrode and the intermediate electrode is different from a second conductivity between another pair of electrodes comprising the second fuse electrode and the intermediate electrode, and when an overcurrent is detected, a portion of the fuse element having been predetermined is melted due to the its associated conductivity, and when an overvoltage is detected, a voltage of the secondary battery is applied to the heating element by the detector, and consequently the heating element generates heat, so that the fuse element is melted and application of the voltage to the heating element is interrupted.

9. The protection circuit according to claim 8, wherein in the first conductivity is based on a first cross-sectional area or a first length of the first portion of the fuse element extending across the pair of electrodes comprising the first fuse electrode and the intermediate electrode, and wherein the second conductivity is based on a second cross-sectional area or a second length of the second portion of the fuse element extending across the other pair of electrodes comprising the second fuse electrode and the intermediate electrode.

10. The protection circuit according to claim 8, wherein in the first conductivity and the second conductivity are adjusted by changing a material type of the fuse element for the pair of electrodes and the other pair of electrodes.

11. The protection circuit according to claim 8, wherein in the first conductivity is based on a first electrode-to-electrode distance between the first fuse electrode and the intermediate electrode of the pair of electrodes, wherein the second conductivity is based on a second electrode-to-electrode distance between the second fuse electrode and the intermediate electrode of the other pair of electrodes, and wherein the first electrode-to-electrode distance is set greater than the second electrode-to-electrode distance.

12. The protection circuit according to claim 8, wherein in the first conductivity is based on a first electric resistance between the first fuse electrode and the intermediate electrode of the pair of electrodes, wherein the second conductivity is based on a second electric resistance between the second fuse electrode and the intermediate electrode of the other pair of electrodes, and wherein the first electric resistance is set greater than the second electric resistance.

13. The protection circuit according to claim 8, wherein the first conductivity is based on a first heat conductivity between the first fuse electrode and the intermediate electrode of the pair of electrodes, wherein the second conductivity is based on a second heat conductivity between the second fuse electrode and the intermediate electrode of the other pair of electrodes, and wherein the first heat conductivity is set to be lower than the second heat conductivity.

14. The protection circuit according to claim 8, wherein the first conductivity is based on a first heat dissipation area of one of the electrodes of the pair of electrodes, wherein the second conductivity is based on a second heat dissipation area of another one of the electrodes of the other pair of electrodes, and wherein the first heat dissipation area is set to be smaller than the second heat dissipation area.

15. The protection circuit according to claim 8, wherein the detector comprises a voltage detection integrated circuit (IC).

16. The protection circuit according to claim 8, wherein the detector comprises a field effect transistor (FET).

* * * * *